United States Patent [19]

Sasaki

[11] Patent Number: 4,894,727
[45] Date of Patent: Jan. 16, 1990

[54] IMAGE PROCESSING SYSTEM AND METHOD

[75] Inventor: Tomio Sasaki, Tokyo, Japan

[73] Assignee: Ricoh Company, Ltd., Japan

[21] Appl. No.: 258,835

[22] Filed: Oct. 17, 1988

[30] Foreign Application Priority Data

| Oct. 20, 1987 | [JP] | Japan | 62-262760 |
| Nov. 9, 1987 | [JP] | Japan | 62-281069 |
| Aug. 5, 1988 | [JP] | Japan | 63-194630 |

[51] Int. Cl.$^4$ ............................................. H04N 1/40
[52] U.S. Cl. ...................................... 358/429; 358/443
[58] Field of Search ............... 358/280, 283, 429, 443

[56] References Cited

U.S. PATENT DOCUMENTS

| 4,194,221 | 3/1980 | Stoffel | 358/257 |
| 4,222,077 | 9/1980 | Yamada | 358/280 |
| 4,366,507 | 12/1982 | Mori | 358/283 |
| 4,389,672 | 5/1983 | Bowen | 358/160 |
| 4,733,300 | 3/1988 | Sugiyama | 358/188 |

FOREIGN PATENT DOCUMENTS

| 0223601 | 5/1987 | European Pat. Off. |
| 0253264 | 1/1988 | European Pat. Off. |
| 0005677 | 1/1986 | Japan | 358/283 |

Primary Examiner—Edward L. Coles, Jr.
Assistant Examiner—Jerome Grant
Attorney, Agent, or Firm—Mason, Fenwick & Lawrence

[57] ABSTRACT

An image processing system processes an input image data related to a dot image which is obtained by scanning a document in a scanning direction. The image processing system smoothens a density of a dot image based on a predetermined smoothing matrix and successively outputs smoothened picture element data which constitute an image data, delays the smoothened picture element data by a predetermined time in the scanning direction, successively averages two picture element data having a mutual time difference equal to the predetermined time and outputs average values, and subjects the average values to a pseudo halftone process.

13 Claims, 16 Drawing Sheets

IMAGE PROCESSING SYSTEM AND METHOD

BACKGROUND OF THE INVENTION

The present invention generally relates to image processing systems and methods, and more particularly to an image processing system and method for use in a real-time image input/output apparatus such as a facsimile machine or a copying machine for digitally processing image data read from a document so as to obtain a reproduced picture of high quality.

Recently, in image input/output apparatus such as a facsimile machine or a digital copying apparatus, image data read from a document is processed digitally and various signal processes are carried out thereon so as to obtain a reproduced picture of high quality.

Conventionally, various methods have been proposed to digitally process the image data of the document. As methods of processing a halftone image (multilevel image) in the facsimile machine, digital copying machine or the like, there are pseudo halftone descriptions of the image such as the so-called dither method. In other words, the local density of the image is detected as a change in the size of a dark point or a bright point. In the process of quantizing the variable density image (hereinafter referred to as dot image) into a binary display, that is, the digital image data, a threshold value used for the binarization is varied according to a random function or a pseudo random function and the density of the input image is described as a number of dots corresponding to a local average value.

When the dot image is described in the pseudo halftone, interference fringes (hereinafter referred to as a moire) occur due to the difference between a spatial frequency of the dots and a spatial frequency of the pseudo halftone description. In order to prevent this moire, the density of the dot image is smoothened by suppressing the density amplitude of the dots.

However, the density of the dots ranges from a fine dot pattern to a coarse dot pattern, and the smoothing process must be carried out over a large region when the moire is to be eliminated even for the coarse dot pattern. For this reason, the number of operations to be carried out increases and the operation time accordingly increases. In addition, it becomes necessary to use a large number of circuit elements and the image processing system becomes expensive.

FIG. 1 shows an example of a document reading apparatus. The document reading apparatus has an optical lens 2, a charge coupled device (CCD) 3, an amplifying circuit 4, an analog-to-digital (A/D) converting circuit 5, a clock driver 6, and a smoothing process circuit 7. MS and SS respectively denote a main scanning direction and a sub scanning direction in which a document 1 is scanned.

A description will now be given of a method of reading the document 1 on the document reading apparatus shown in FIG. 1. The document 1 is read by the scanning in two directions, that is, the main scanning direction MS in which the CCD 3 is electrically scanned and the sub scanning direction SS in which a scanning position on the document 1 is moved. The scan in the sub scanning direction SS may be carried out by moving the document 1 or by moving the optical system while keeping the document 1 stationary. A document image formed on the CCD 3 is outputted from the CCD 3 as an analog image signal, but this analog image signal has an extremely small amplitude and is thus amplified in the amplifying circuit 4. The amplified analog image signal from the amplifying circuit 4 is converted into a multilevel (for example, 64 gradation level) digital image signal for each picture element in the A/D converting circuit 5. The multilevel digital image signal from the A/D converting circuit 5 is supplied to the smoothing process circuit 7 and subjected to a smoothing process. The smoothed multilevel digital image signal from the smoothing process circuit 7 is further subjected to a pseudo halftone process (hereinafter referred to as a dither process) in a circuit which is omitted in FIG. 1.

In a copying machine, for example, the scan in the sub scanning direction SS is carried out by varying the moving speed of the document 1 during a variable power mode in the case where the scan in the sub scanning direction SS is carried out by moving the document 1. Similarly, the scan in the sub scanning direction SS is carried out by varying the moving speed of the optical system during the variable power mode in the case where the scan in the sub scanning direction SS is carried out by moving the optical system. Furthermore, the variable power is realized electrically in the main scanning direction MS, that is, by subtracting (decimation) and adding image information.

When the document image is a dot image and the dot image is outputted through a binarizaton process, that is, when a fixed threshold level is used, the moire occurs and the picture quality is deteriorated because the reading density of the CCD 3 differs from the density of the dot image. The use of the fixed threshold level means that a gradation level of 32 or more is assumed to be white (or black) when there are 64 gradation levels, for example. In addition, when the pseudo halftone description (dither description) is used for the dot image, the moire occurs due to a periodic difference between the input image read by the CCD 3 and the dither pattern. In order to prevent the above described moire, the density of the dots is smoothed so as to reduce the density amplitude of the dots.

But when the dot pattern is coarse, the smoothing must be carried out over a large region. As a result, there are problems in that the smoothing process circuit 7 becomes complex, bulky and expensive. Furthermore, the number of times the operation is carried out increases and the operation time increases, thereby limiting a high-speed processing of the image date.

FIG. 2 shows a smoothing matrix pattern for explaining a smoothing region in which the density of the dot image is smoothed. FIG. 2 shows for convenience sake a matrix pattern of five picture elements by five picture elements (hereinafter simply referred to as a 5×5 matrix pattern). An object picture element is indicated by a double hatching. The 5×5 matrix pattern shown in FIG. 2 has the object picture element located at the center with five picture elements arranged in the main scanning direction MS and five picture elements arranged in the sub scanning direction SS. In other words, the 5×5 matrix pattern indicates a region of 25 picture elements.

The smoothing region is of course not limited to the 5×5 matrix pattern, and the size of the smoothing region may be varied to a 3×3 matrix pattern, a 7×7 matrix pattern or the like depending on the reading density. The smoothing region indicated by the smoothing matrix pattern time-sequentially moves from the main scanning direction MS to the sub scanning direction SS and the entire region of the document is processed in real time.

The smoothing of the density with respect to the dot image is carried out by setting a weight of each picture element to "1" within the smoothing region described by the 5×5 matrix pattern. In other words, the density ratio is determined by the area ratio between the black picture elements and the total number (25) of picture elements within the smoothing region.

The density ratio in the matrix pattern is determined by a process of adding the weights "1" of all of the picture elements within the matrix pattern and dividing a final sum by a number of black picture elements within the matrix pattern. In the above described case where the smoothing region is the 5×5 matrix pattern, the weights "1" of all of the 25 picture elements are added. Such an addition of the weights is conventionally carried out in the following sequence.

First, the 25 picture element data are divided into group of 24 picture element data and one picture element datum, and the 24 picture element data within the group are added in twos so as to obtain twelve sums. The twelve sums are then added in twos to obtain six sums, and the six sums are further added in twos to obtain three sums. The three sums and the one picture element datum other than the 24 picture element data in the group are added in twos to obtain two sums, and these two sums are added to obtain a final sum. The sequence and number of additions can be summarized as follows, and a total number of additions carried out is 24 (=12+6+3+2+1).

(1) Twelve additions to add the 24 picture element data in twos;

(2) Six additions to add the twelve sums obtained in the step (1) in twos;

(3) Three additions to add the six sums obtained in the step (2) in twos;

(4) Two additions to add the three sums obtained in the step (3) and the one picture element datum other than the 24 picture element data in the group in twos; and (5) One addition to add the two sums obtained in the step 4) so as to obtain the final sum.

When the weights of the picture elements are all "1" as described above, it is possible to first add the picture element data in only one column along the sub scanning direction SS indicated by hatchings by three additions, then latch the sum obtained within the one column in the main scanning direction MS four times, and add the five sums in the main scanning direction MS by three additions. In this case, it is possible to reduce the number of additions.

In the case where the weights of the picture elements are other than "1", it is possible to first multiply the weights to each picture element datum and then add the picture element data multiplied by the weights.

The pattern of the dot image ranges from the fine pattern to the coarse pattern, and the size of the smoothing matrix pattern increases as the pattern of the dot image becomes coarse. FIG. 3A through 3E respectively show the dot image applicable to the smoothing matrix pattern amounting to one line in the main scanning direction MS. Only the scan in the main scanning direction MS will be described because the same holds true for the scan in the sub scanning direction SS.

FIGS. 3A through 3E show the patterns of the dot image ranging from the fine pattern to the coarse pattern in this sequence, and the picture elements are either white or black (denoted by hatchings) so as to simplify the description. It is assumed that the phase of the white or black conforms to the picture elements. In FIG. 3A, the white (or black) amounting to one picture element occurs for every other picture elements. In FIG. 3B, the white (or black) amounting to two picture elements occur for every two picture elements. In FIG. 3C, the white (or black) amounting to three picture elements occur for every three picture elements. In FIG. 3D, the white (or black) amounting to four picture elements occur for every four picture elements. In FIG. 3E, the white (or black) amounting to four picture elements occur for every four picture elements.

FIGS. 4A through 4E are graphs respectively showing the density ratios of the dot image patterns shown in FIGS. 3A through 3E when samples are taken in the main scanning direction MS in the 5×5 smoothing matrix pattern shown in FIG. 2, where each picture element has the weight "1" and a center picture element out of five successive picture elements arranged in the main scanning direction MS is taken as the object picture element.

The density ration is 40% to 60% and the density amplitude of the dots is reduced in FIGS. 4A through 4C. But in FIGS. 4D and 4E, the dot pattern is coarse and the density amplitude of the dots is not reduced. Hence, during the dither process which is carried out in a latter stage, the moire occurs due to the interference between the coarse dot pattern and the dither pattern. But in order to reduce the moire even when the dot pattern is coarse as in FIGS. 4D and 4E, it is necessary to enlarge the smoothing matrix pattern which would consequently result in the need of a large scale operation.

SUMMARY OF THE INVENTION

Accordingly, it is a general object of the present invention to provide a novel and useful image processing system and an image processing method in which the problems described heretofore are eliminated.

Another and more specific object of the present invention is to provide an image processing system for processing input image data related to a dot image which is obtained by scanning a document in a scanning direction, comprising first means for smoothing the density of a dot image based on a predetermined smoothing matrix and for successively outputting picture element data which constitute image data, second means for delaying the output picture element data of the first means by a predetermined time in the scanning direction, third means for successively averaging two picture element data having a mutual time difference equal to the predetermined time and for outputting average values, and fourth means for subjecting the average values from the third means to a pseudo halftone process. According to the image processing system of the present invention, it is possible to prevent the generation of moire caused by an interference between the dot pattern of the image and the dither pattern used in the pseudo halftone process, even in the case of a coarse dot pattern. In addition, the required operation is simple, and for this reason, the required circuit construction becomes simple, the operation time is effectively reduced, and it is possible to reduce the cost of the circuit. Further, there is not need to increase the size of the smoothing matrix.

Still another object of the present invention is to provide an image processing system for processing input image data related to a dot image which is obtained by scanning a document repeatedly in a main scanning direction along a sub scanning direction, comprising first means for smoothing the density of a dot image based on a predetermined smoothing matrix and for successively outputting picture element data which constitute image data, second means for delaying the output picture element data of the first means by a first predetermined time in the main scanning direction, third means for delaying the output picture element data of the first means by a second predetermined time in the sub scanning direction, fourth means for successively averaging two picture element data having a mutual time difference equal to the first predetermined time in the main scanning direction and for outputting first average values, fifth means for successively averaging two picture element data having a mutual time difference equal to the second predetermined time in the sub scanning direction and for outputting first average values, sixth means for successively averaging the first and second average values and for outputting third average values, and seventh means for subjecting the third average values from the sixth means to a pseudo halftone process. According to the image processing system of the present invention, it is possible to prevent the generation of moire caused by an interference between the dot pattern of the image and the dither pattern used in the pseudo halftone process, even in the case of a coarse dot pattern or the case where the dot pattern is arranged in a direction inclined to the main or sub scanning direction.

A further object of the present invention is to provide an image processing method of processing an input image data related to a dot image which is obtained by scanning a document in a scanning direction, comprising the steps of smoothing a density of a dot image based on a predetermined smoothing matrix so as to successively output smoothened picture element data which constitute an image data, delaying the smoothened picture element data by a predetermined time in the scanning direction, successively averaging two picture element data having a mutual time difference equal to the predetermined time so as to output average values, and subjecting the average values to a pseudo halftone process.

Another object of the present invention is to provide an image processing method of processing an input image data related to a dot image which is obtained by scanning a document repeatedly in a main scanning direction along a sub scanning direction, comprising the steps of smoothing a density of a dot image based on a predetermined smoothing matrix so as to successively output smoothened picture element data which constitute an image data, delaying the smoothened picture element data by a first predetermined time in the main scanning direction, delaying the smoothened picture element data by a second predetermined time in the sub scanning direction, successively averaging two picture element data having a mutual time difference equal to the first predetermined time in the main scanning direction to output first average values, successively averaging two picture element data having a mutual time difference equal to the second predetermined time in the sub scanning direction to output second average values, successively averaging the first and second average values to output third average values, and subjecting the third average values to a pseudo halftone process.

Other objects and further features of the present invention will be apparent from the following detailed description when read in conjunction with the accompanying drawings.

BRIEF DESCRIPTION OF THE DRAWINGS

FIGS. 10A through 10E are diagrams for explaining dot patterns which are inclined by 45 degrees with respect to the main scanning direction and the sub scanning direction;

FIG. 14 shows a smoothing pattern which is obtained by use of a sum of the densities corresponding to picture elements located at four points surrounded by a triangular mark in FIG. 13;

DETAILED DESCRIPTION

Figure 4A:
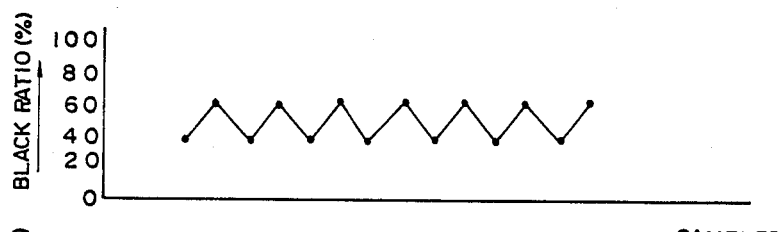
FIGS. 4A through 4E are graphs respectively showing density ratios of the dot image patterns shown in FIGS. 3A through 3E when samples are taken in the main scanning direction in the smoothing matrix pattern shown in FIG. 2.
Figure 4B:
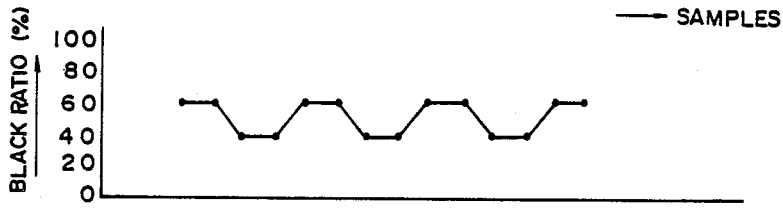
Figure 4C:
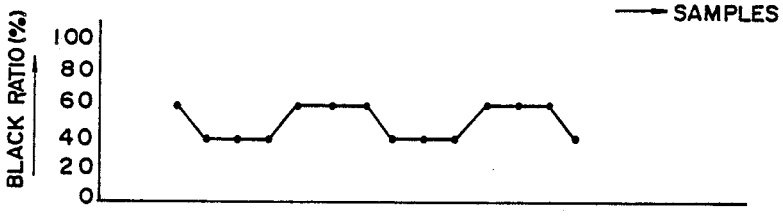
Figure 4D:
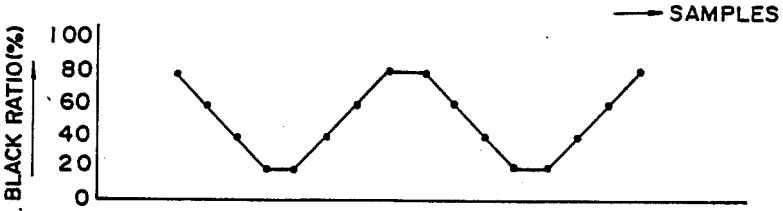
Figure 4E:
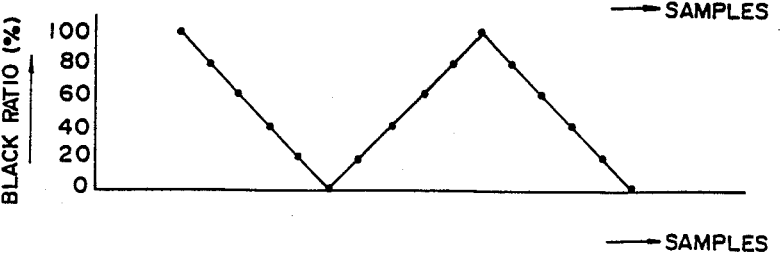

As may be seen from FIGS. 4D and 4E, the density ratio regularly includes a low ratio and a high ratio which occur alternately. Hence, it is possible to reduce the density amplitude of the dots by obtaining an average of the high density ratio and the low density ratio for the smoothened data in the main scanning direction MS. FIGS. 5A through 5E are graphs respectively showing density ratios for explaining the results obtained when the smoothed data are averaged for picture elements located at different positions along the main scanning direction MS.

FIGS. 5A through 5E respectively show the density ratios of black (black ratio (%)) obtained by averaging the smoothed data shown in FIGS. 4A through 4E at intervals of four picture elements. In other words, FIGS. 5A through 5E each show the average value of the density of the object picture element and the density of the picture element located four picture elements away in the main scanning direction MS from the object picture element. As may be seen from FIGS. 5A through 5E, the density amplitude of the dots is also reduced in the cases shown in FIGS. 5D and 5E. Therefore, it can be readily seen that the moire occurring due to the interference between the coarse dot pattern and the dither pattern can be reduced.

Figure 6:
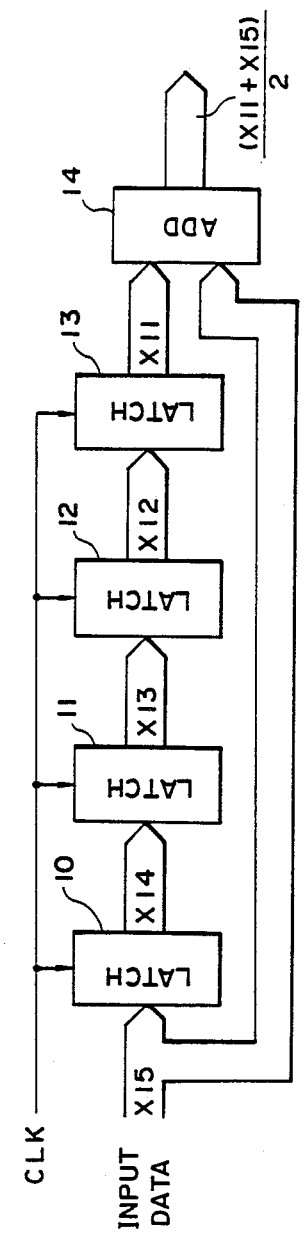
FIG. 6 is a system block diagram showing an essential part of a first embodiment of the image processing system according to the present invention.
Figure 7:
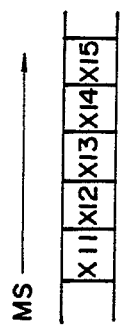
FIG. 7 shows picture element positions in the main scanning direction of data applied to a latch circuit shown in FIG. 6.

FIG. 6 shows an essential part of a first embodiment of the image processing system according to the present invention for obtaining an average value of the smoothed data at the intervals of four picture elements in the main scanning direction MS of the smoothing matrix pattern. The image processing system has latch circuits 10 through 13, and an adder 14 which are connected as shown. The latch circuits 10 through 13 respectively latch an incoming data responsive to a clock signal CLK. FIG. 7 shows the picture element positions in the main scanning direction MS, where picture element data X11 through X15 are the data applied to the latch circuit 10 in this sequence.

In FIG. 6, the picture element data X15 shown in FIG. 7 is applied to the latch circuit 10 at an arbitrary time. It is assumed for convenience sake that the incoming data to the latch circuit 10 is the smoothed data obtained by use of the 5×5 smoothing matrix pattern shown in FIG. 2, however, the smoothened data may of course be obtained by other methods. The smoothed data applied to the latch circuit 10 has a density ratio such as those shown in FIGS. 4A through 4E, and each smoothed picture element data is latched a total of four times in the latch circuits 10, 11, 12 and 13.

Accordingly, at a time when the picture element data X15 is applied to the latch circuit 11, the adder 14 is supplied with the picture element data X11 and X15. The adder 14 shifts the bits of the received picture element data by one bit so as to store the data as a value having ½ the actual value. As a result, the data $(X11+X15)/2$ is outputted from the adder 14. This data $(X11+X15)/2$ is the density data averaged at the interval of four picture elements. The output of the adder 14 becomes as shown in FIGS. 12D through 12E, and the averaging of the density is also achieved for the coarse dot pattern corresponding to the cases shown in FIGS. 5D and 5E.

Thus, it is possible to carry out the smoothing process without enlarging the smoothing region even when the dot pattern is coarse. In other words, by employing the block system shown in FIG. 6 and noting the periodic nature in the main scanning direction MS, it is possible to reduce the density amplitude of the dots by obtaining the average of the smoothed data having different positions.

In the description above, the average of the smoothed data is obtained for each picture element separated by four picture elements in the main scanning direction MS from the object picture element. However, it is possible to average the smoothed data for each picture element separated in the main scanning direction MS by a distance other than four picture elements from the object picture element, and the distance may be variable.

Figure 8:
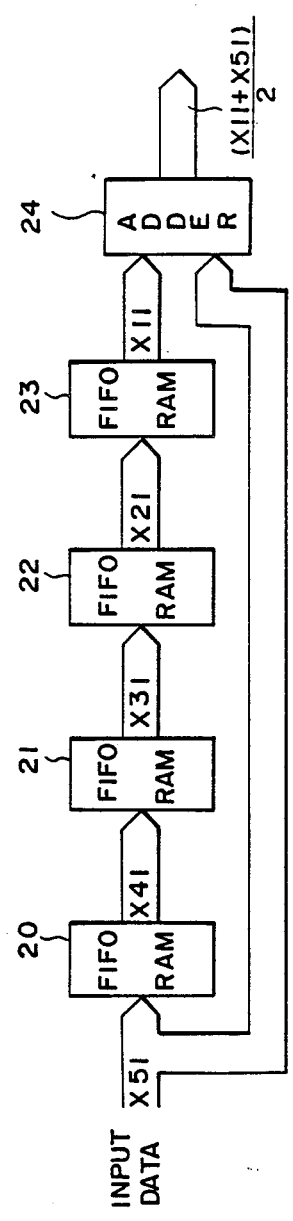
FIG. 8 is a system block diagram showing an essential part of a second embodiment of the image processing system according to the present invention.
Figure 9:
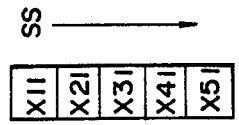
FIG. 9 shows picture element positions in the sub scanning direction of data applied to a FIFO RAM shown in FIG. 8.

FIG. 8 shows an essential part of a second embodiment of the image processing system according to the present invention for obtaining an average value of the smoothed data at the intervals of four picture elements (four lines) in the sub scanning direction SS of the smoothing matrix pattern. The image processing system has first-in-first-out random access memories (FIFO RAMs) 20, 21, 22 and 23, and an adder 24 which are connected as shown. FIG. 9 shows the picture element positions in the sub scanning direction SS, where picture element data X11 through X51 are the data applied to the FIFO RAM 20 in this sequence.

The FIFO RAMs 20 through 23 respectively carry out a read/write operation responsive to a read/write signal and a clock signal (both not shown), and introduce a delay corresponding to one line in the main scanning direction MS. In other words, when the picture element data X51 is applied to the FIFO RAM 20, the FIFO RAM 20 applies the picture element data X41 to the FIFO RAM 21. When the picture element data X41 is applied to the FIFO RAM 21, the FIFO RAM 21 applies the picture element data X31 to the FIFO RAM 22. When the picture element data X31 is applied to the FIFO RAM 22, the FIFO RAM 22 applies the picture element data X21 to the FIFO RAM 23. In addition, when the picture element data X21 is applied to the FIFO RAM 23, the FIFO RAM 23 applies the picture element data X11 to the adder 24.

Accordingly, at a time when the picture element data X51 is applied to the FIFO RAM 20, the adder 24 is supplied with the picture element data X11 and X51. The adder 24 shifts the bits of the incoming data by one bit and obtains the data X11/2 and X51/2 in this case, and outputs an added data $(X11+X51)/2$.

The pattern of the dot image, the smoothed data and the image data obtained as a result of the processing carried out in the block system of FIG. 8 are basically the same as those in the block system shown in FIG. 6 wherein the processing is carried out in the main scanning direction MS, except that each picture element has the weight "1" and a center picture element out of five successive picture elements arranged in the sub scanning direction SS is taken as the object picture element in the case of FIG. 8.

Figure 5A:
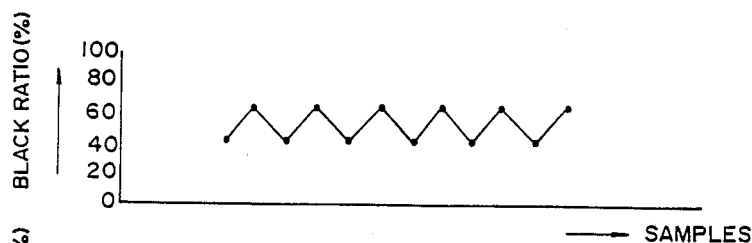
FIGS. 5A through 5E are graphs respectively showing density ratios for explaining the results obtained when the smoothened data are averaged for picture elements at mutually different positions along the main scanning direction.
Figure 5B:
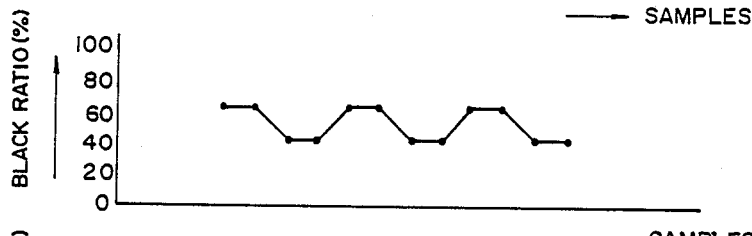
Figure 5C:
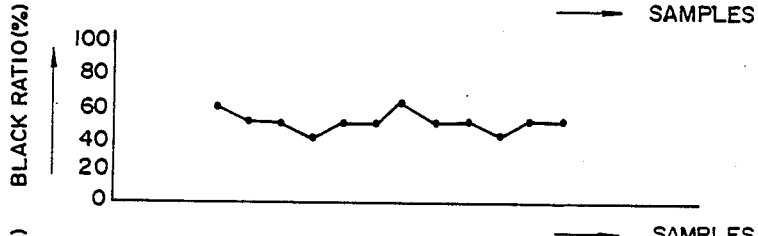
Figure 5D:
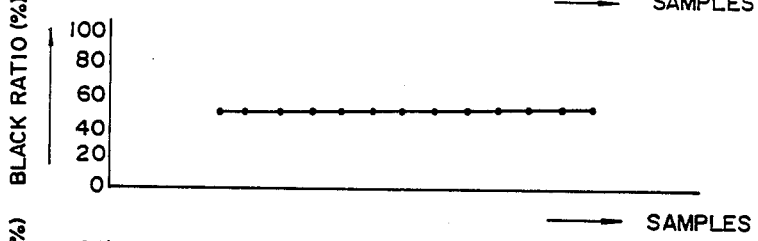
Figure 5E:
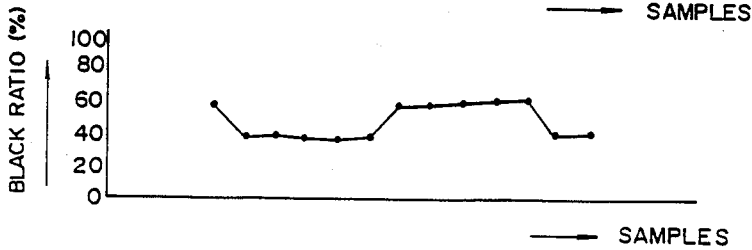

As for the image data obtained as a result of the processing in the sub scanning direction SS, even in the case of the coarse dot pattern, the smoothened data such as those shown in FIGS. 4D and 4E can further be smoothed by averaging the smoothed data such as those shown in FIGS. 5D and 5E. That is, FIGS. 5A through 5E also show the average value of the object picture element data and the data of the picture element located at the position delayed by four lines in the sub scanning direction SS from the object picture element. Hence, by employing the block system shown in FIG. 8 and noting the periodic nature in the sub scanning direction SS, it is possible to reduce the density amplitude of the dots by obtaining the average of the smoothed data having different positions, even with respect to the coarse dot pattern and without enlarging the smoothing region. It is thus possible to reduce the moire caused by the interference between the dot pattern and the dither pattern.

In the description above, the average of the smoothed data is obtained for each picture element separated by four picture elements in the sub scanning direction SS from the object picture element. However, it is possible to average the smoothed data for each picture element separated in the sub scanning direction SS by a distance other than four picture elements from the object picture element, and the distance may be variable.

The image processing systems shown in FIGS. 6 and 8 can reduce the moire caused by the interference between the coarse dot pattern and the dither pattern when the pattern of the dot image is regularly arranged in the main scanning direction MS and the sub scanning direction SS. But in actual practice, the pattern of the dot image may be regularly arranged in a direction inclined with respect to the main scanning direction MS and the sub scanning direction SS. Hence, a description will hereunder be given of a case where the pattern of the dot image is regularly arranged in a direction inclined by 45 degrees with respect to the main scanning direction MS and the sub scanning direction SS. In this case, the generation of the moire is a maximum.

FIGS. 10A through 10E are diagrams for explaining the dot patterns which are inclined by 45 degrees with respect to the main scanning direction MS and the sub scanning direction SS. In each of FIGS. 10A through 10E, the right hand side shows the data of the dot image shown on the left hand side when the dot image data is smoothed by use of the 5×5 smoothing matrix pattern. In other words, the right hand side of each of FIGS. 10A through 10E shows the density distribution. FIGS. 10A through 10E respectively show the cases where the white (or black) repeats for n picture elements with an interval of n picture elements, where n=1, ..., 5.

In FIGS. 10A through 10E, the data values indicate the number of black picture elements within the 5×5 smoothing matrix pattern and corresponds to the black ratio (%) which is obtained by dividing the data value by 25 and multiplying 100 thereto. A range between the maximum and minimum density amplitudes is shown.

FIGS. 11A through 11E respectively show the smoothed data obtained by averaging the smoothed data of the picture elements shown in FIGS. 10A through 10E located at different positions along the main scanning direction MS and the sub scanning direction SS in the block systems shown in FIGS. 6 and 8. It may be seen from FIGS. 11A through 11E that the density ratio is smoothened to approximately 50%, but as for the case shown in FIG. 10E it is evident from FIG. 11E that there is no effect of smoothing even when the average is obtained of the smoothened data of the picture elements located at the different positions along the main scanning direction MS and the sub scanning direction SS. In other words, when the pattern of the dot image becomes coarse, the smoothing effect is small with respect to the dot pattern inclined with respect to the main scanning direction MS or the sub scanning direction SS.

On the other hand, even when the positions of the picture element data to be added are further separated, the smoothing effect still becomes small as the pattern of the dot image becomes coarse.

Figure 11A:
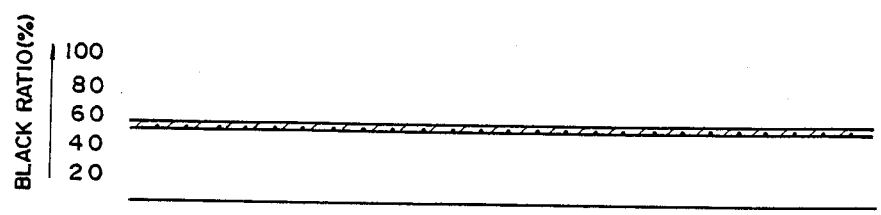
FIGS. 11A through 11E respectively show smoothened data obtained by averaging the smoothened data of the picture elements shown in FIGS. 10A through 10E located at different positions along the main scanning direction and the sub scanning direction in the block systems shown in FIGS. 6 and 8.
Figure 11B:
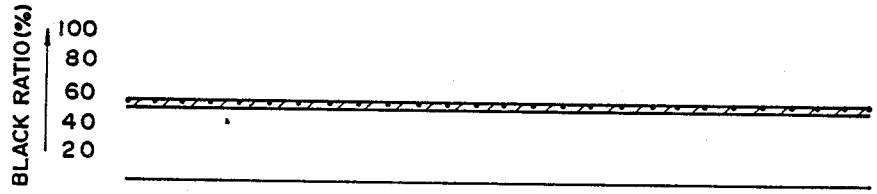
Figure 11C:
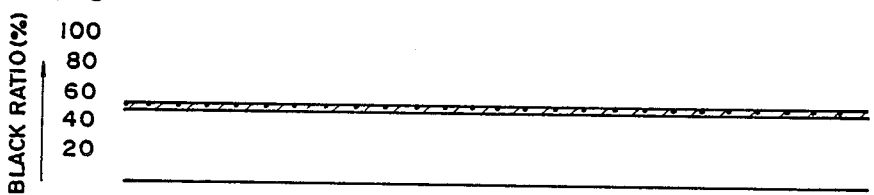
Figure 11D:
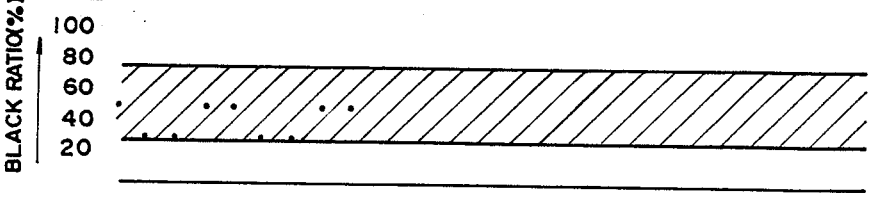
Figure 11E:
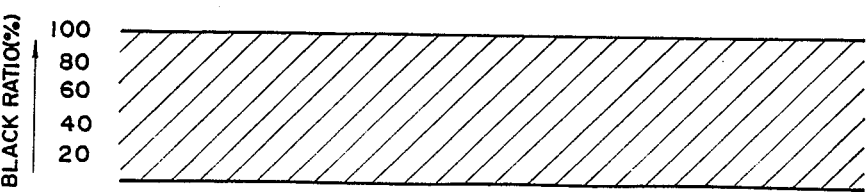
Figure 12A:
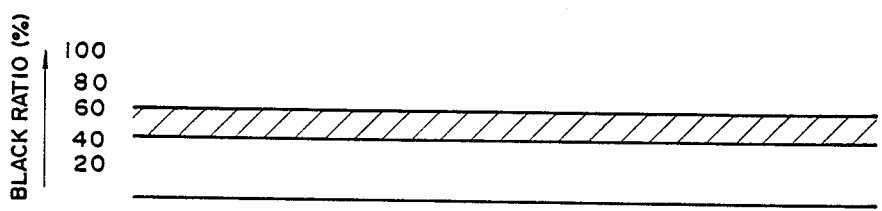
FIGS. 12A and 12B respectively show density ratios of FIGS. 11D and 11E when picture elements having different positions along the main scanning direction or the sub scanning direction is a step amounting to five picture elements.
Figure 12B:
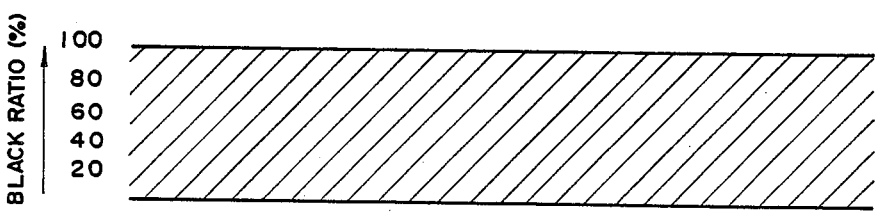

FIGS. 12A and 12B respectively show the density ratios of FIGS. 11D and 11E when the picture elements having different positions along the main scanning direction MS or the sub scanning direction SS is a step amounting to five picture elements. As may be seen from FIGS. 12A and 12B, the density ratio distributions have a width, and there is not much difference between the corresponding FIGS. 11D and 11E as the pattern of the dot image becomes coarse.

Accordingly, when the pattern of the dot image is located along the main scanning direction MS or the sub scanning direction SS, it is possible to reduce the moire between the dot pattern and the dither pattern (processing pattern for the pseudo halftone description) by obtaining the average of the smoothened data of the picture elements located a certain distance away from the object picture element in the main scanning direction MS or the sub scanning direction SS. However, when the pattern of the dot image is inclined to the main scanning direction MS or the sub scanning direction SS and especially in the case of a coarse dot pattern, the simple averaging along the main scanning direction MS or the sub scanning direction SS cannot eliminate the moire, and there is a problem in that the moire is generated between the dot pattern and the dither pattern.

Figure 13:
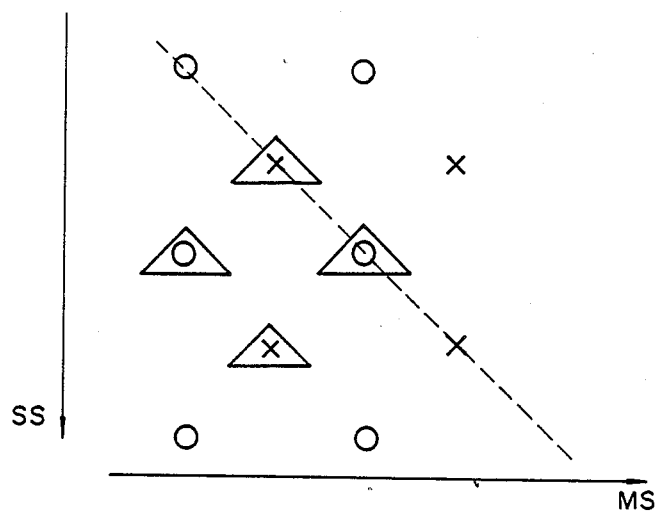
FIG. 13 schematically shows the density of a dot image for explaining an embodiment of an image processing method according to the present invention.

FIG. 13 schematically shows the density of a dot image for explaining an embodiment of an image processing method according to the present invention. In FIG. 13, a circular mark "o" denotes a peak position of a picture element having a high density and a cross mark "x" denotes a peak position of a picture element having a low density.

Figures 10A, 10B:
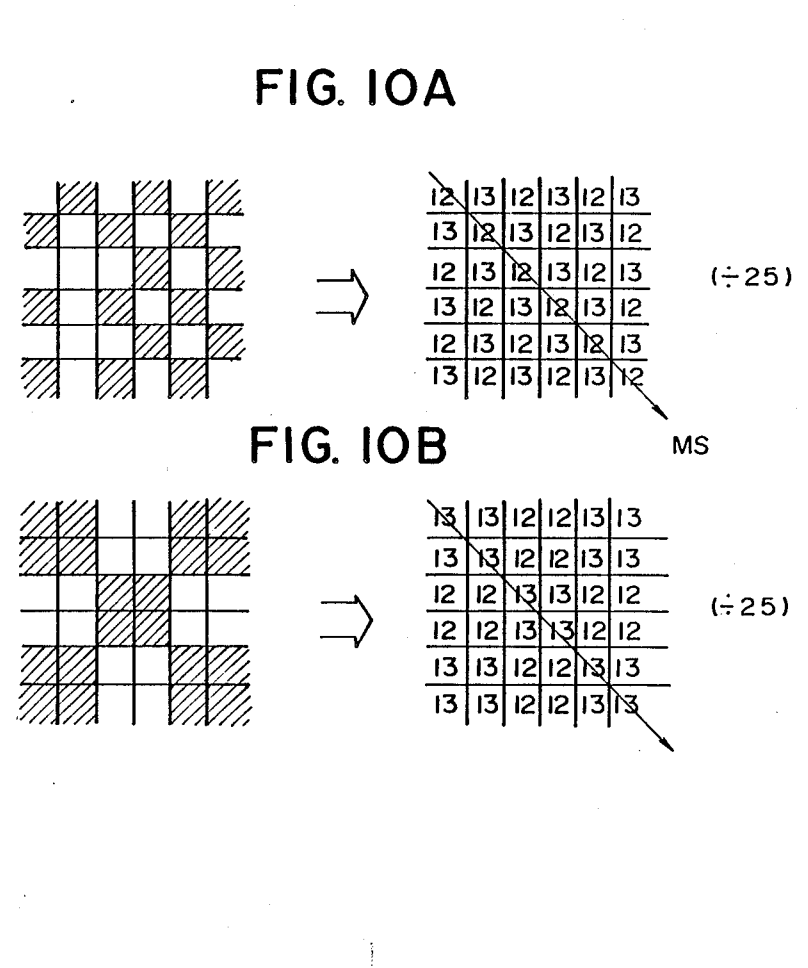
Figure 10C:
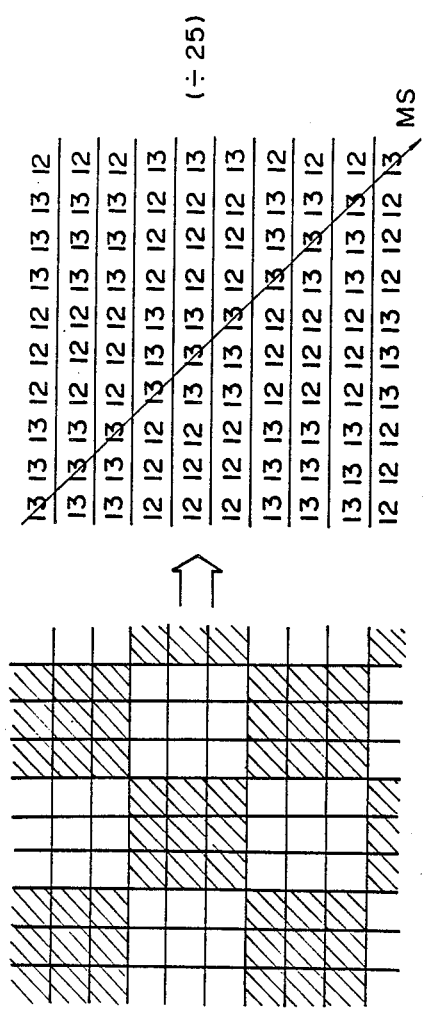
Figure 10D:
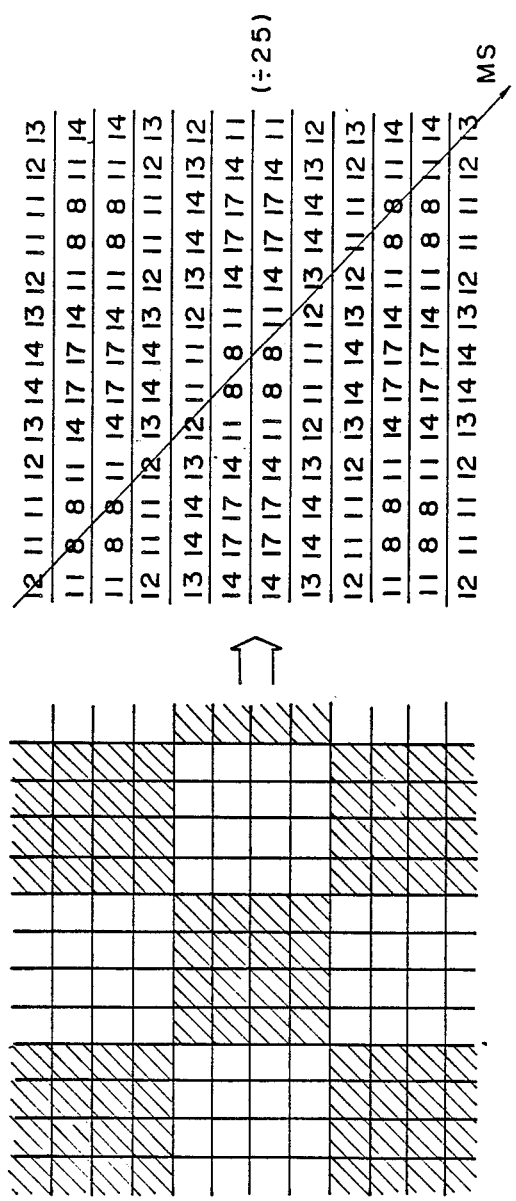
Figure 10E:
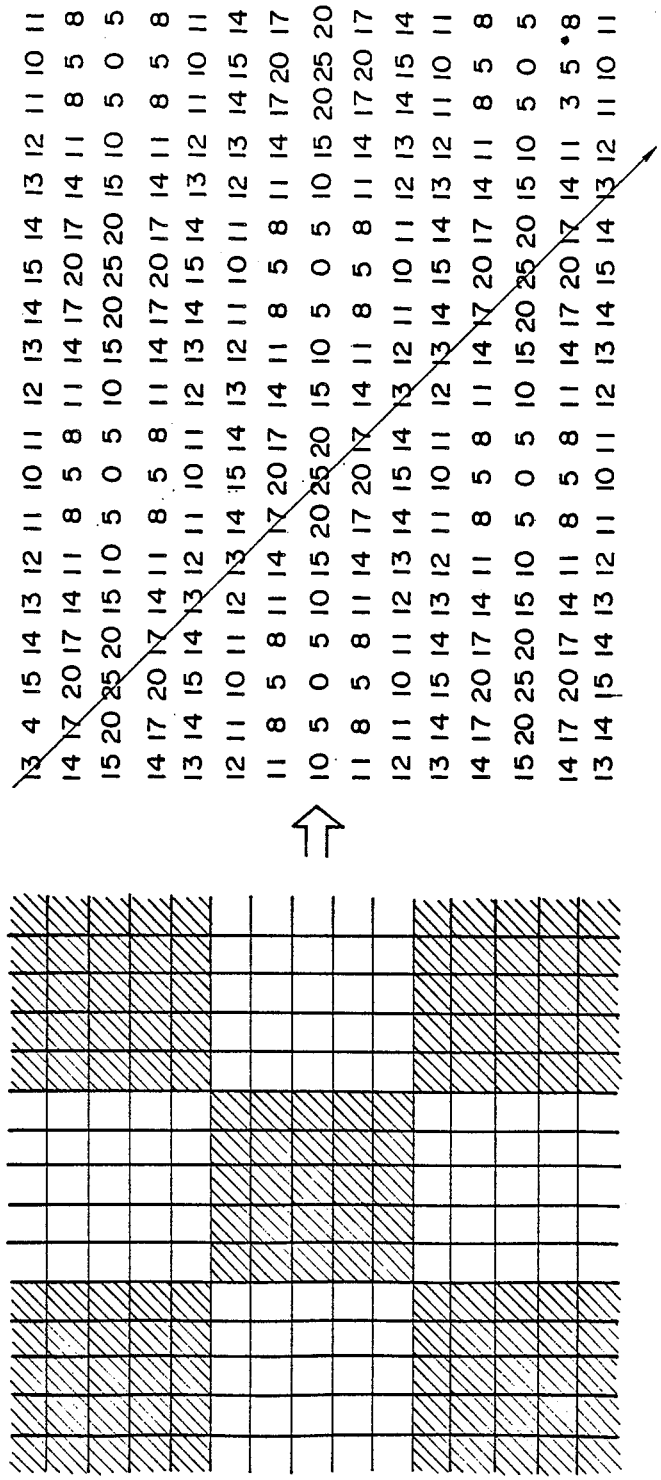

As described before, even when a sum is obtained of smoothed data of picture elements having different positions along the main scanning direction MS or the sub scanning direction SS, the smoothing effect becomes small when the dot image is inclined with respect to the scanning direction. The smoothing effect becomes a minimum when the inclination of the dot image is 45 degrees with respect to the main or sub scanning direction. When attention is drawn to the density (that is, the smoothed data), it is seen that the high density and the low density alternately occur as shown in FIG. 10E described before. In other words, the high density and the low density occur periodically in the main or sub scanning direction, however, the density distribution in the main scanning direction MS is not in phase with the density distribution in the sub scanning direction SS.

Hence, as may be seen from FIG. 13, the pattern is such that the peak value denoted by "x" of the low density exists on a diagonal line on which the peak value denoted by "o" of the high density exists. Therefore, in this embodiment, the periodical nature of the pattern is used and the smoothing is carried out by obtaining a sum of the four points surrounded by a triangular mark.

Figure 14:
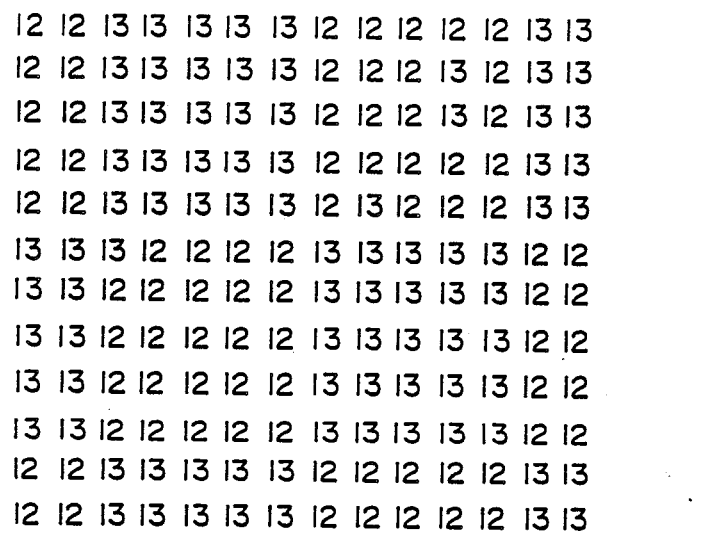

FIG. 14 shows a smoothing pattern which is obtained by use of the sum of the densities corresponding to the picture elements located at the four points surrounded by the triangular mark in FIG. 13. FIG. 14 shows the smoothing pattern for the case corresponding to FIG. 10E described before wherein the smoothing effect is the minimum when the averaging is simply carried out of the data of the picture elements located at the different positions along the main or sub scanning direction.

The smoothing effect is considerably reduced when the dot image is inclined to the main or sub scanning direction and the smoothing simply involves the adding of the smoothened data of the picture elements located at different positions along the main or sub scanning direction. However, as may be seen from FIG. 14, it is possible to reduce the density amplitude regardless of the inclination of the dot image with respect to the main or sub scanning direction by obtaining a sum for the average value of the smoothed data of first picture elements located at different positions along the main scanning direction and the average value of the smoothed data of second picture elements which are located at different positions along the sub scanning direction and intersect the first picture elements. Accordingly, the periodic nature fades between the dot pattern and the dither pattern (processing pattern for the pseudo halftone description), and the generation of the moire is effectively reduced.

Figure 15:
FIG. 15 shows a data matrix used in the embodiment of the image processing method.

FIG. 15 shows a data matrix used in this embodiment, and data X11 through X77 are the data smoothed by use of the 5×5 smoothing matrix pattern described before. In FIG. 15, an average of the sums is obtained for the sum of the data of the first picture elements located at different positions (that is, positioned with intervals of five picture elements) along the main scanning direction MS and the sum of the data of the second picture elements which are located at different positions (that is, positioned with intervals of five lines) along the sub scanning direction SS and intersect the first picture elements, and the average (or data) is (X14+X41+X47+X74)/4.

Figure 16:
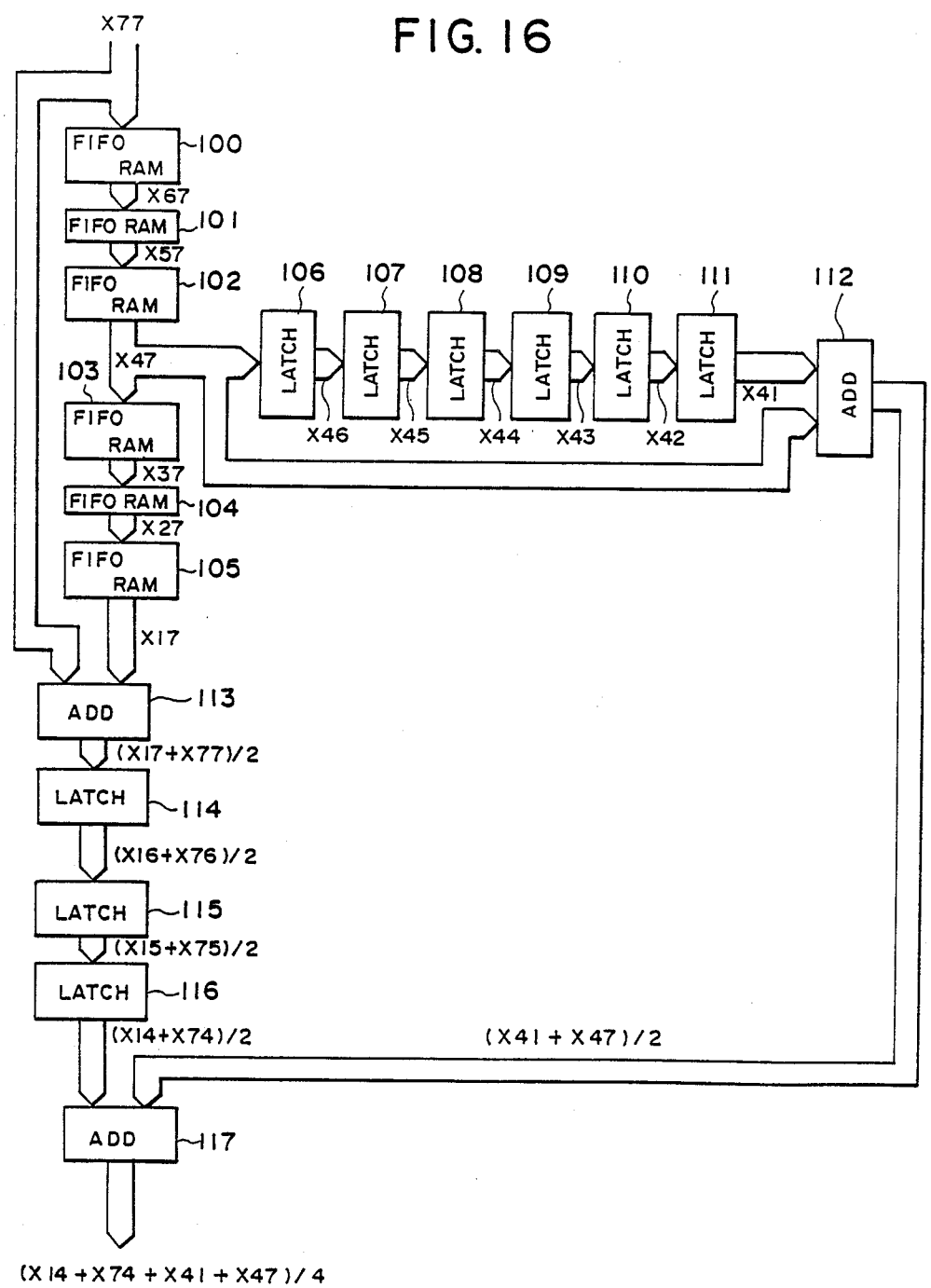
FIG. 16 is a system block diagram showing an essential part of a third embodiment of an image processing system according to the present invention for smoothing data.

FIG. 16 shows an essential part of a third embodiment of an image processing system according to the present invention which employs the embodiment of the image processing method described above. The system shown in FIG. 16 carries out the operation described in conjunction with FIG. 15. The image processing system has FIFO RAMs 100 through 105, latch circuits 106 through 111 and 114 through 116, and adders 112, 113 and 117. The FIFO RAMs 100 through 105 are used as data delay means for delaying data in the sub scanning direction SS. The latch circuits 106 through 111 are used as data delay means for delaying data in the main scanning direction MS.

Figure 1:
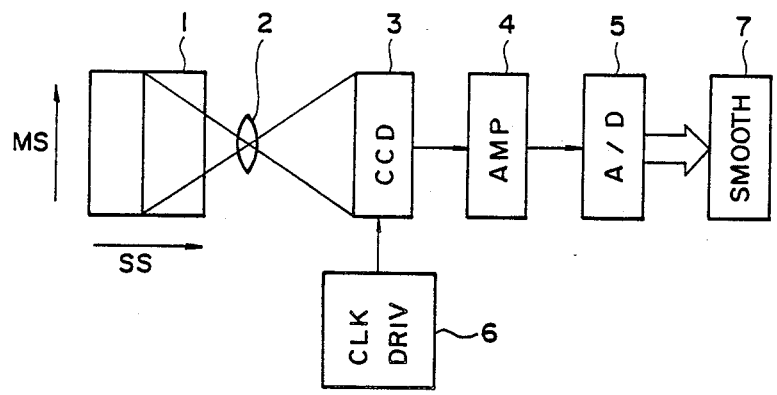
FIG. 1 is a system block diagram showing an example of a document reading apparatus.
Figure 2:
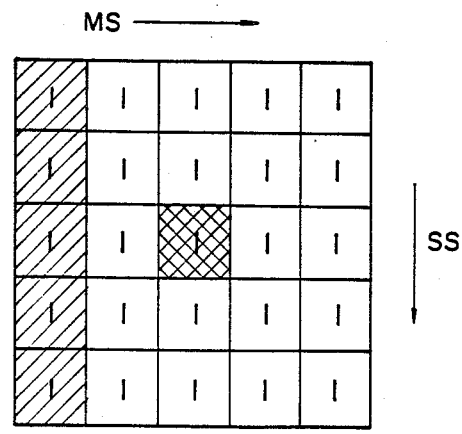
FIG. 2 shows a smoothing matrix pattern for explaining a smoothing region in which the density of a dot image is smoothened.
Figure 3A:
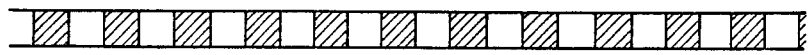
FIGS. 3A through 3E respectively show dot images applicable to a smoothing matrix pattern amounting to one line in a main scanning direction.
Figure 3B:
Figure 3C:
Figure 3D:
Figure 3E:

When the FIFO RAM 100 writes the data X77 shown in FIG. 2, the data X67 is read by the FIFO RAM 100. This data X67 is delayed by one line with respect to the data X77. Similarly, the data X57, X47, X37, X27 and X17 are respectively read by the FIFO RAMs 101 through 105.

The latch circuits 106 through 111 respectively delay the incoming data in the main scanning direction MS responsive to a clock signal (not shown). In this state, when the data X47 is applied to the latch circuit 106, the latch circuits 106 through 111 respectively latch the data in the main scanning direction MS and output the data X46 through X41. Hence, the adder 112 adds the data X41 and X47 which are separated by five picture elements in the main scanning direction, and outputs the data (X41+X47)/2 by shifting bits by one bit at the input or output of the adder 112.

The adder 113 outputs the data (X77+X17)/2 which is latched in the main scanning direction MS in the latch circuits 114 through 116. As a result, the data (X14+X74)/2 is outputted from the latch circuit 116.

The data from the adder 112 and the data from the latch circuit 116 are added in the adder 117, and the data (X14+X74+X41+X47)/2 is finally outputted from the adder 117.

The output data of the adder 117 is the input data at the stage of the pseudo halftone process, and is an average of an average value of the smoothened data of the first picture elements located at different positions along the main scanning direction MS and an average of the smoothed data of the second picture elements which are located at different positions along the sub scanning direction SS and intersect the first picture elements. Even when the dot image is inclined to the main or sub scanning direction, the density amplitude is averaged. Hence, by using the output data of the adder 117 as the input data at the stage of the pseudo halftone process, the periodic nature fades between the dot pattern and the dither pattern and the generation of the moire is reduced thereby.

The interval along the main scanning direction MS is not limited to five picture elements and the interval along the sub scanning direction SS is also not limited to five lines as in the case of FIG. 15. The size of the smoothing matrix pattern may be set arbitrarily, and for example, the interval along the main scanning direction MS may be four picture elements and the interval along the sub scanning direction SS may be four lines.

As may be seen from FIGS. 4D and 4E, the density ratio regularly includes a low ratio and a high ratio which occur alternately. Hence, it is possible to reduce the density amplitude of the dots by obtaining an average of the high density ratio and the low density ratio for the smoothed data in the main scanning direction MS. FIGS. 5A through 5E are graphs respectively showing density ratios after the smoothing for explaining the effects of this embodiment.

FIGS. 5A through 5E respectively show the density ratios of black (black ratio (%)) obtained by averaging the smoothed data shown in FIGS. 4A through 4E at intervals of four picture elements. In other words, FIGS. 5A through 5E each show the average value of the density of the object picture element and the density of the picture element located four picture elements away in the main scanning direction MS from the object picture element. As may be seen from FIGS. 5A through 5E, the density amplitude of the dots is also reduced in the cases shown in FIG. 5D and 5E. Therefore, it can be readily seen that the moire occurring due to the interference between the coarse dot pattern and the dither pattern can be reduced.

Further, the present invention is not limited to these embodiments but various variations and modifications may be made without departing from the scope of the present invention.

What is claimed is:

1. An image processing system for processing input image data related to a variable density dot image which is obtained by scanning a document in a predetermined scanning direction, said image processing system comprising:

first means for smoothing the density of said dot image based on a predetermined smoothing matrix and for successively outputting picture element data which is composed of image data;

second means for delaying said output picture element data of said first means by a predetermined time in said predetermined scanning direction;

third means responsive to said delayed picture element data received from said second means for successively averaging two of said picture element data having a mutual time difference equal to said predetermined time and for outputting average values; and fourth means for subjecting the average values from said third means to a pseudo halftone process.

2. An image processing system as claimed in claim 1 in which the document is scanned repeatedly in a main scanning direction along a sub scanning direction, and said second means delays the output picture element data of said first means by said predetermined time in the main scanning direction.

3. An image processing system as claimed in claim 2 in which said predetermined time corresponds to a predetermined number of picture elements arranged in the main scanning direction.

4. An image processing system as claimed in claim 1 in which the document is scanned repeatedly in a main scanning direction along a sub scanning direction, and said second means delays the output picture element data of said first means by said predetermined time in the sub scanning direction.

5. An image processing system as claimed in claim 4 in which said predetermined time corresponds to a predetermined number of picture elements or lines arranged in the sub scanning direction.

6. An image processing system for processing input image data related to a dot image which is obtained by scanning a document repeatedly in a main scanning direction along a sub scanning direction, said image processing system comprising:
first means for smoothing the density of a dot image based on a predetermined smoothing matrix and for successively outputting picture element data which is composed of image data;
second means for delaying the output picture element data of said first means by a first predetermined time in the main scanning direction;
third means for delaying the output picture element data of said first means by a second predetermined time in the sub scanning direction;
fourth means for successively averaging two picture element data having a mutual time difference equal to said first predetermined time in the main scanning direction and for outputting first average values;
fifth means for successively averaging two picture element data having a mutual time difference equal to said second predetermined time in the sub scanning direction and for outputting second average values;
sixth means for successively averaging said first and second average values and for outputting third average values; and
seventh means for subjecting the third average values from said sixth means to a pseudo halftone process.

7. An image processing system as claimed in claim 6 in which said sixth means averages the first average value of picture element data related to first picture elements located at different positions along the main scanning direction and the second average value of picture element data related to second picture elements which are located at different positions along the sub scanning direction and intersect the first picture elements.

8. An image processing method for processing input image data related to a variable density dot image which is obtained by scanning a document in a predetermined scanning direction, said image processing method comprising the steps of:
smoothing the density of the dot image based on a predetermined smoothing matrix so as to successively output smoothed picture element data which is composed of image data;
delaying the smoothed picture element data by a predetermined time in the predetermined scanning direction;
successively averaging two delayed picture element data having a mutual time difference equal to said predetermined time so as to output average values; and
subjecting the average values to a pseudo halftone process.

9. An image processing method as claimed in claim 8 in which the document is scanned repeatedly in a main scanning direction along a sub scanning direction, and said step of delaying the smoothed picture element data delays the smoothed picture element data by said predetermined time in the main scanning direction.

10. An image processing method as claimed in claim 9 in which said predetermined time corresponds to a predetermined number of picture elements arranged in the main scanning direction.

11. An image processing method as claimed in claim 8 in which the document is scanned repeatedly in a main scanning direction along a sub scanning direction, and said step of delaying the smoothed picture element data delays the smoothed picture element data by said predetermined time in the sub scanning direction.

12. An image processing method as claimed in claim 11 in which said predetermined time corresponds to a predetermined number of picture elements or lines arranged in the sub scanning direction.

13. An image processing method of processing input data related to a dot image which is obtained by scanning a document repeatedly in a main scanning direction along a sub scanning direction, said image processing method comprising the steps of:
smoothing the density of a dot image based on a predetermined smoothing matrix so as to successively output smoothened picture element data which constitute an image data;
delaying the smoothened picture element data by a first predetermined time in the main scanning direction;
delaying the smoothened picture element data by a second predetermined time in the sub scanning direction;
successively averaging two picture element data having a mutual time difference equal to said first predetermined time in the main scanning direction to output first average values;
successively averaging two picture element data having a mutual time difference equal to said second predetermined time in the sub scanning direction to output second average values;
successively averaging said first and second average values to output third average values; and
subjecting the third average values to a pseudo halftone process.

* * * * *